W. A. PATSCHEIDER.
ELECTRIC SEAM WELDING DEVICE.
APPLICATION FILED OCT. 29, 1918.
1,304,594.
Patented May 27, 1919.
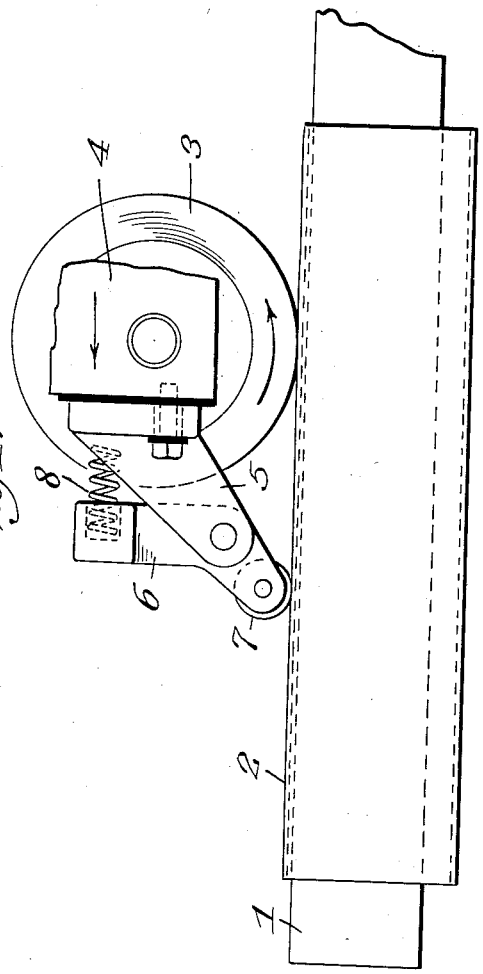
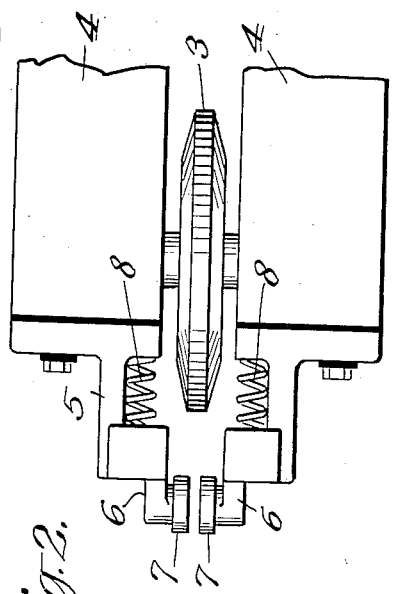
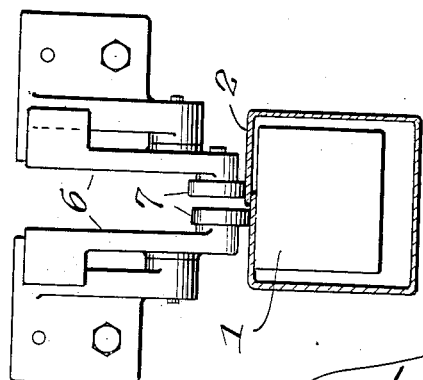
INVENTOR
Walter A. Patscheider
BY
Townsend & Decker
ATTORNEYS

UNITED STATES PATENT OFFICE.

WALTER A. PATSCHEIDER, OF LYNN, MASSACHUSETTS, ASSIGNOR TO THOMSON ELECTRIC WELDING COMPANY, OF LYNN, MASSACHUSETTS, A CORPORATION OF MASSACHUSETTS.

ELECTRIC SEAM-WELDING DEVICE.

1,304,594.  Specification of Letters Patent.  Patented May 27, 1919.

Application filed October 29, 1918. Serial No. 260,080.

*To all whom it may concern:*

Be it known that I, WALTER A. PATSCHEIDER, a citizen of the United States, and a resident of Lynn, in the county of Essex and State of Massachusetts, have invented certain new and useful Improvements in Electric Seam-Welding Devices, of which the following is a specification.

My invention relates to electric seam welding apparatus and particularly to the means for clamping the seam to the work support so that it will not spread or become distorted as the roller contact electrode progressively travels along the seam in making the weld.

In electrically seam welding overlapping edges of sheet metal supported on a straight electrode, the roller electrode in traveling along the lapped edges or edges to be united causes the same to separate due to the pressure necessary for welding, thereby producing an imperfect weld or failure to weld at all.

The following methods are being used to overcome this condition, to wit: (1) The overlapping edges of the sheet metal are clamped along their entire length against a flat electrode; (2) the work being welded is confined to its proper shape in a form or fixture thus preventing distortion.

The object of my invention is to simplify the clamping of the lapped edges or edges to be seam welded and thereby simplify the apparatus and speed up the production of the welded seam.

The invention consists in the improved electric seam welding apparatus hereinafter more particularly described and then specified in the claims.

In the accompanying drawings, Figure 1 is a side elevation of a portion of a seam welding apparatus constructed in accordance with my invention.

Fig. 2 is a plan view of the same.

Fig. 3 is an end elevation looking in the direction of the seam clamping device.

Electric seam welding machines are now in wide commercial use and their construction and operation are well known. Therefore in the accompanying drawings only so much of such an apparatus as is necessary to understand the present invention is shown, standard and commonly known features being removed for clearness and simplicity.

1 indicates the support for the work indicated at 2 which in the case illustrated remains stationary during the welding operation. The work support preferably in the form of a copper horn or mandrel forms one terminal of the secondary of an electric heating transformer as is usual. Upon this support the work 2 is placed with its edges to be joined lapped to the desired extent, the lapped or other seam being as usual disposed longitudinally of the horn or mandrel.

3 indicates the roller contact electrode of copper or other suitable conducting material and, as usual, forming the other terminal of the transformer secondary. The contact roller 3 is suitably mounted in trunnions in a carriage 4 which is fed along the seam in the direction of the arrow A relative to the mandrel 1 by means of any suitable mechanism, the contact roller rotating in contact with the work in the direction of the arrow B.

Rigidly secured to the carriage 4 on each side of the contact roller 3 is a bracket 5. The brackets are suitably insulated from the carriage and project forwardly of the roller 3. Pivotally mounted in the end of each bracket is a clamping lever 6. In the lower arm of this lever is a work-engaging or clamping device preferably in the form of a roller 7 of metal, insulation or any suitable material. A spring 8 acting on the other arm of the lever causes the roller 7 to exert clamping pressure on the work.

The rollers 7 each engage the work 2 on opposite sides of the seam to be welded and preferably as close as possible to it and due to the pressure of the springs 8 clamp the work to the support 1 along the line of the seam. These clamping rollers travel with the contact or welding roller 3 and prevent the pressure of said welding roller spreading the seam.

As each clamping lever 6 and roller 7 is, by preference and as shown, independently mounted and has its own pressure spring 8, they are each independently adjustable to varying thicknesses or inequalities in the work on opposite sides of the seam.

It will be understood that this invention may be embodied in any desired form of electric seam welding apparatus and that it is not limited to the details of construction or arrangement of parts as shown and described except as may be specified in the appended claims.

What I claim as my invention is:

1. In an electric seam welding apparatus, a work support, a roller contact electrode and a clamping device adapted to travel along the seam in advance of said roller and progressively clamp the work to said support.

2. In an electric seam welding apparatus, a work support, a roller contact electrode and a pair of clamping devices traveling with and in advance of said roller, said clamping devices being adapted to engage the work on either side of the seam and clamp it to said support.

3. In an electric seam welding apparatus, a work support, a roller contact electrode and a clamping roller adapted to travel with and in advance of said roller contact to clamp the work to said support in advance of said roller contact.

4. In an electric seam welding apparatus, a work support, a roller contact electrode and a spring-pressed clamping roller adapted to travel with and in advance of said roller contact to clamp the work to said support in advance of said roller contact.

5. In an electric seam welding apparatus, a work support, a carriage adapted to travel in line with said support, a roller contact electrode secured to said carriage and a pair of clamping rollers secured to said carriage and adapted to engage the work on opposite sides of the seam in advance of said contact roller.

6. In an electric seam welding apparatus, a work support, a carriage adapted to travel in line with said support, a roller contact electrode secured to said carriage and a pair of spring-pressed clamping rollers secured to said carriage and each adapted to act independently of the other to engage and clamp the work to the support on opposite sides of the seam in advance of the contact roller.

7. In an electric seam welding apparatus, the combination with a support for the work, a carriage, a roller contact electrode secured to said carriage, a bracket secured to said carriage and projecting forwardly of said contact roller and a clamping roller in the end of said bracket and adapted to engage the work forwardly of said contact roller to clamp the seam to said support.

8. In an electric seam welding apparatus, the combination with a support for the work, a carriage, a roller contact electrode secured to said carriage, a bracket secured to said carriage on each side of said roller contact, said brackets projecting forwardly from said roller and a clamping roller secured to the end of each bracket and adapted to engage the work and clamp the seam to said support in advance of said contact roller.

9. In an electric seam welding apparatus, the combination with a support for the work, a carriage, a roller contact electrode secured to said carriage, a bracket secured to said carriage on each side of said roller contact, said brackets projecting forwardly from said roller and a spring-pressed clamping lever pivoted in the end of each bracket as and for the purpose described.

Signed at Cincinnati, in the county of Hamilton and State of Ohio, this eighteenth day of October, A. D. 1918.

WALTER A. PATSCHEIDER.

Witnesses:
L. G. PALMER,
W. J. OVERBECK.